United States Patent
Tsuru et al.

(10) Patent No.: US 6,782,921 B1
(45) Date of Patent: Aug. 31, 2004

(54) HIGH-STRENGTH STEEL PIPE EXCELLENT IN FORMABILITY AND BURST RESISTANCE

(75) Inventors: Eiji Tsuru, Futtsu (JP); Takuya Hara, Futtsu (JP); Hitoshi Asahi, Futtsu (JP); Hideki Miyazaki, Kimitsu (JP); Tatsuya Yoshida, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/296,854

(22) PCT Filed: Jun. 8, 2001

(86) PCT No.: PCT/JP01/04877
§ 371 (c)(1),
(2), (4) Date: Nov. 26, 2002

(87) PCT Pub. No.: WO01/94043
PCT Pub. Date: Dec. 13, 2001

(30) Foreign Application Priority Data

Jun. 9, 2000 (JP) ............................. 2000-174146
May 30, 2001 (JP) ............................. 2001-163306
May 30, 2001 (JP) ............................. 2001-163327

(51) Int. Cl.$^7$ ............................................. F16L 9/14
(52) U.S. Cl. ........................ 138/142; 138/171; 29/6.1
(58) Field of Search .......................... 138/142, 170, 138/171; 29/6.1

(56) References Cited

U.S. PATENT DOCUMENTS

| | | | | |
|---|---|---|---|---|
| 1,665,851 A | * | 4/1928 | Harris | 219/59.1 |
| 4,339,941 A | * | 7/1982 | Taira et al. | 72/412 |
| 4,558,721 A | * | 12/1985 | Trudell et al. | 138/151 |
| 5,275,893 A | * | 1/1994 | Miyasaki et al. | 428/683 |
| 5,397,654 A | * | 3/1995 | Endo et al. | 428/683 |
| 6,129,999 A | * | 10/2000 | Ueda et al. | 428/683 |
| 6,188,037 B1 | * | 2/2001 | Hamada et al. | 219/61 |
| 6,224,689 B1 | * | 5/2001 | Koo et al. | 148/320 |
| 6,379,821 B2 | * | 4/2002 | Kushida et al. | 428/685 |
| 6,532,995 B1 | * | 3/2003 | Asahi et al. | 138/171 |

FOREIGN PATENT DOCUMENTS

| | | |
|---|---|---|
| JP | 59-199117 | 11/1984 |
| JP | 9-10850 | 1/1997 |

* cited by examiner

Primary Examiner—James Hook
(74) Attorney, Agent, or Firm—Kenyon & Kenyon

(57) ABSTRACT

A high-strength steel pipe excellent in formability and burst resistance wherein, when a high-strength steel pipe exceeding 850 N/mm$^2$ in tensile strength is produced by a UOE method, a ratio (R/r) of an average radius of curvature in a range of 120 mm in a circumferential direction including a weld of the steel pipe before pipe expansion in a pipe expansion process (R) to the radius of the steel pipe after pipe expansion (r) is 0.65 to 2.0, and preferably the ratio (R/r) is 0.90 to 2.0. Preferably, Vickers hardness of the base metal Hv, the minimum Vickers hardness at the HAZ Hz, pipe wall thickness t, and a peaking amount at the weld of the steel pipe before pipe expansion in a pipe expansion process δ satisfy the following expression, $$(1+0.005t|\delta|)Hz < 0.03584Hv^2 - 25.34Hv + 4712.$$

4 Claims, 11 Drawing Sheets

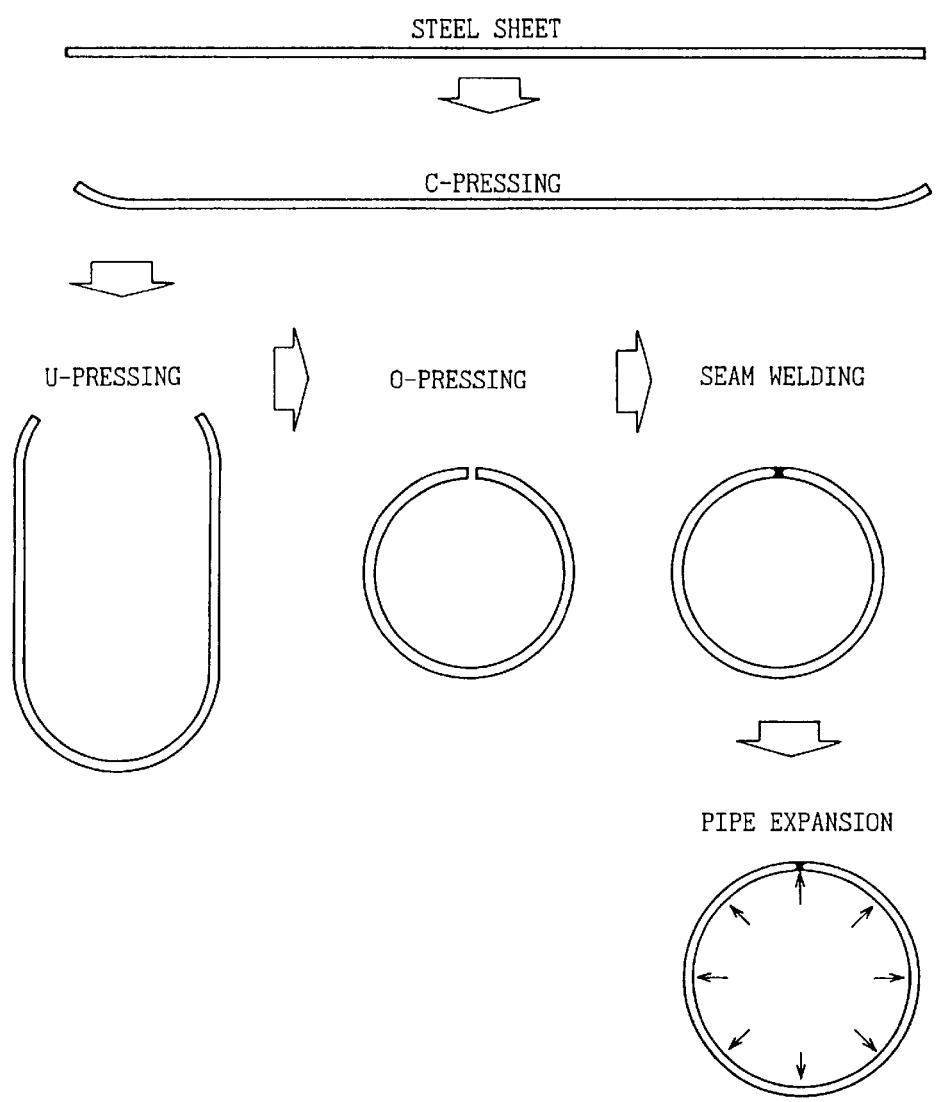

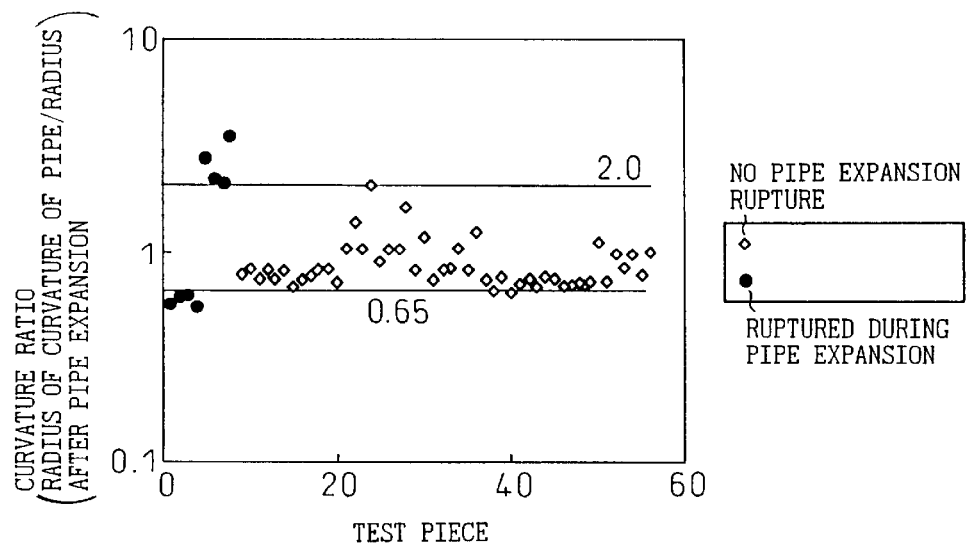

SEGMENT FOR PIPE EXPANSION

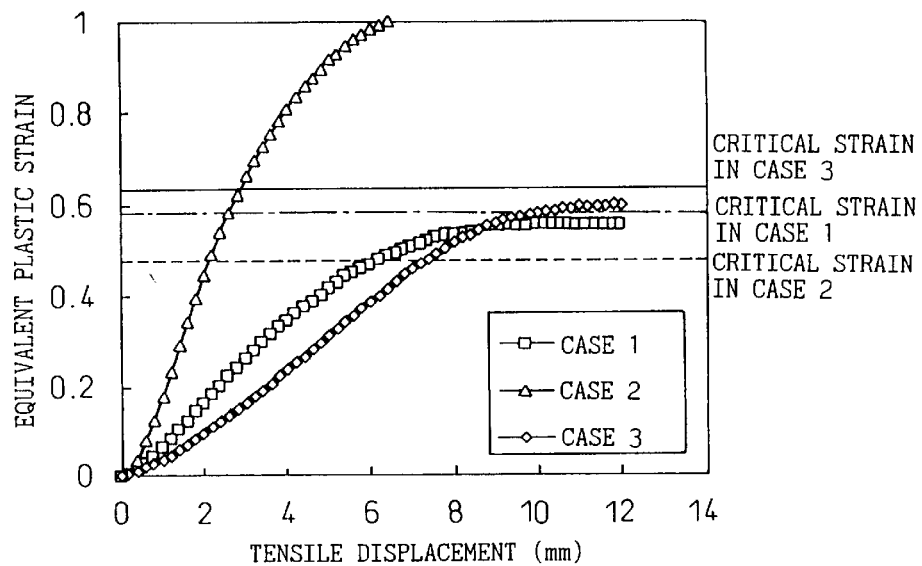
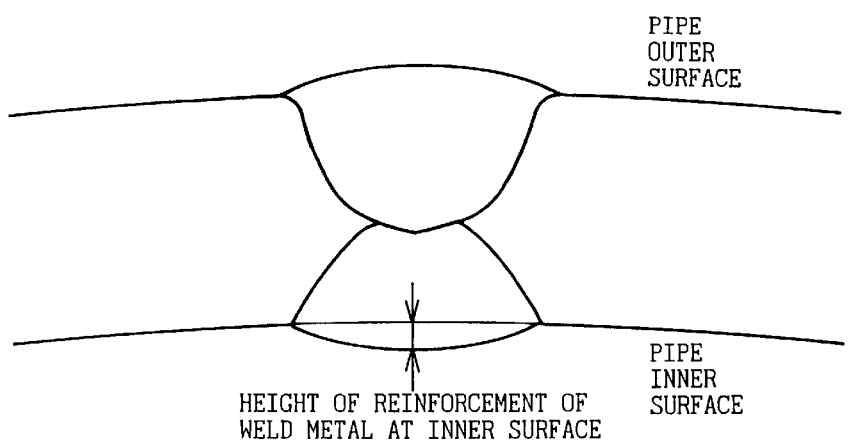

HIGH-STRENGTH STEEL PIPE EXCELLENT IN FORMABILITY AND BURST RESISTANCE

TECHNICAL FIELD

The present invention relates to a high-strength steel pipe having improved formability and burst resistance when the steel pipe is formed by a UOE manufacturing method.

BACKGROUND ART

The group of processes for producing a steel pipe by a UOE method is generally composed of the processes of: C-forming (pressing) of a steel sheet, U-forming (pressing), O-forming (pressing), seam welding and pipe expansion, as shown in FIG. 1. In the C-forming process, beveling is applied to both the edges of a steel sheet and then bending is applied to the vicinities of the edges of the steel sheet. The bending is mostly applied with press forming, but it is also possible to form bent portions in the vicinities of the edges of a steel sheet with roll forming as disclosed in Japanese Unexamined Patent Publication No. S61-279313. The steel sheet after being subjected to the C-forming is then formed into a "U-shape" in a U-forming process, and thereafter formed into a tubular shape in an O-forming process. After that, both the edges of the steel sheet formed into a tubular shape, whose bevel ends are in butting relation with each other, are seam-welded in a seam welding process. At this stage, a pipe closed in the circumferential direction is formed for the first time and, then, the pipe is subjected to pipe expansion using a pipe expansion device called an expander in a pipe expansion process for obtaining a better tubular shape, namely for improving the roundness of the pipe. As the methods of expanding a pipe, there are two methods; the mechanical pipe expansion method wherein a deformation is imposed forcibly from the interior of a pipe towards the exterior thereof, and the hydraulic pressure pipe expansion method wherein a hydraulic pressure is imposed in the interior of a pipe. At present, the former method is mostly employed. Note that, though there is the method of reducing the diameter of a pipe from the exterior thereof for improving the roundness of the pipe in contrast with the above pipe expansion methods, this method is differentiated from the UOE method.

In the past, in the UOE method for producing a steel pipe, many inventions have been produced for improving formability such as roundness, the capacity of existing facilities and the formability of a pipe having a heavy wall thickness by specifying the forming conditions in each of the processes of C-forming, U-forming, O-forming and pipe expansion.

For example, in the forming method of C-pressing, Japanese Patent Application No. H8-294724 discloses a method of reducing peaking (a positive deviation from the concentric circle at a weld) and making it possible to form a heavy thickness material or a high-strength material by prescribing a specific relation to the forming length, the yield strength of a sheet material and the thickness thereof in the C-forming process, without increasing the capacity of C-pressing and/or O-pressing.

Further, Japanese Unexamined Patent Publication Nos. H9-239447 and H10-211520 disclose that bad shapes can be improved even within the capability of existing facilities by: controlling the length of the bending region to 3.5 times or more the sheet thickness or controlling the length of the remaining straight portion to 1.5 times or less the sheet thickness when C-forming is applied; and, by so doing, restricting peaking (a protrusion at an abutting portion in this technology to 2 mm or less. Yet further, Japanese Patent No. 1135933 discloses a technology that enables the shape of a steel pipe to be improved by controlling the ratio between the radius of curvature at C-pressing (the radius of curvature before O-pressing) and the radius of curvature of the steel pipe within the range from 0.8 to 1.2 and, by so doing, reducing peaking. As technologies developed by the forming conditions in C-pressing as disclosed above, there have been proposed the technologies disclosed in Japanese Unexamined Patent Publications No. S55-14724, No. S59-199117 and No. S60-92015.

In addition, as a technology for improving the formability in O-pressing, there is the technology of reducing peaking by forming a heteromorphic portion at the center of a die caliber in the longitudinal direction as disclosed in Japanese Patent No. 1258977. Moreover, there are other technologies of improving O-pressing as proposed in Japanese Unexamined Patent Publications No. H9-94611 and No. S53-112260.

Further, as a technology of correcting roundness and bending by devising a pipe expansion process, there is the technology of applying pressing several times while the relative positions of a caliber and a material to be formed are changed as disclosed in Japanese Unexamined Patent Publication No. H03-94936. As other technologies, there are the technologies of improving roundness in relation to pipe expansion as proposed in Japanese Unexamined Patent Publication Nos. S57-94434 and S61-147930.

In recent years, the importance of a line pipe has been increasing still more as a means of long distance transportation of crude oil and natural gas. In particular, in order (1) to improve a transportation efficiency by applying a higher pressure and (2) to improve a field construction efficiency by reducing the outer diameter and weight of a line pipe, the needs for a high-strength line pipe exceeding X100 (760 $N/mm^2$ or more in tensile strength) have been getting stronger. To cope with these needs, in recent years, a technology of applying TMCP even to the production of a steel sheet exceeding 760 $N/mm^2$ in tensile strength, which has been difficult so far (refer to Japanese Unexamined Patent Publication No. H8-199292) has been developed.

In the meantime, as the strengthening of a line pipe advances, it has been clarified that the softening of a heat affected zone (a HAZ), which has scarcely been considered until now as a problem, when a medium- or low-strength material of about 700 $N/mm^2$ in tensile strength has been welded with submerged arc welding or the like, advances and the critical plastic strain, at which ductile cracking starts to occur during the forming of a sheet material, lowers when a high-strength material exceeding 850 $N/mm^2$ in tensile strength is used. Therefore, when a line pipe exceeding 850 $N/mm^2$ in tensile strength is formed, problems such as cracking and rupture at a weld in a pipe expansion process after seam welding and brittle rupture at a seam weld when an obtained steel pipe product is subjected to an internal pressure load occur. These problems did not appear when a conventional medium- or low-strength steel pipe was produced.

DISCLOSURE OF THE INVENTION

The object of the present invention is, in view of problems in the existing technologies as stated above, to provide a method of producing a high-strength steel pipe so excellent in formability as not to incur cracking and rupture at a weld in a pipe expansion process when such a high-strength steel pipe, for line pipe use, exceeding 850 N/mm² in tensile strength is produced and so excellent in burst resistance as not to incur brittle rupture at a seam weld even when the steel pipe product is subjected to an internal pressure load during its service.

The present invention has been accomplished for solving the above-mentioned problems and the gist of the present invention is as follows:

(1) A high-strength steel pipe excellent in formability, characterized in that, when a high-strength steel pipe exceeding 850 N/mm² in tensile strength is produced by a UOE method, the ratio (R/r) of the average radius of curvature in the range of 120 mm in the circumferential direction including the weld of the steel pipe before pipe expansion in a pipe expansion process (R) to the radius of the steel pipe after pipe expansion (r) is 0.65 to 2.0.

(2) A high-strength steel pipe excellent in formability and burst resistance, characterized in that, when a high-strength steel pipe exceeding 850 N/mm² in tensile strength is produced by a UOE method, the ratio (R/r) of the average radius of curvature in the range of 120 mm in the circumferential direction including the weld of the steel pipe before pipe expansion in a pipe expansion process (R) to the radius of the steel pipe after pipe expansion (r) is 0.90 to 2.0.

(3) A high-strength steel pipe excellent in formability, characterized in that, when a high-strength steel pipe exceeding 850 N/mm² in tensile strength is produced by a UOE method, the absolute value of the strain in the circumferential direction at a point 4 mm distant from each of the toes of the weld during pipe expansion is 4% or less.

(4) A high-strength steel pipe excellent in burst resistance, characterized in that, when a high-strength steel pipe exceeding 850 N/mm² in tensile strength is produced by a UOE method, the absolute value of the strain in the circumferential direction at a point 4 mm distant from each of the toes of the weld during pipe expansion is 2.5% or less.

(5) A high-strength steel pipe excellent in burst resistance, characterized in that, when a high-strength steel pipe exceeding 850 N/mm² in tensile strength is produced by a UOE method, the peaking amount before pipe expansion satisfies the expression (1) and at least the height of the shrinkage allowance of the weld metal at the inner surface is 2.0 mm or less, $$-1.5 \text{ mm} \leq \text{peaking amount (mm)} \leq 16/\text{pipe wall thickness (mm)} \quad (1).$$

(6) A high-strength steel pipe excellent in burst resistance according to the item (5), characterized in that the change in the peaking amount from before pipe expansion to after pipe expansion satisfies the expression (2), $$-1.5 \text{ mm} \leq \text{change in peaking amount (mm)} \leq 1.0 \text{ mm} \quad (2).$$

(7) A high-strength steel pipe excellent in burst resistance, characterized in that, when a high-strength steel pipe 900 N/mm² or more in tensile strength is produced by a UOE method, the Vickers hardness of the base metal of the steel pipe Hv, the minimum Vickers hardness at the HAZ Hz, the pipe wall thickness t, and the amount of peaking deviated from the perfect circle in the range of 120 mm in the circumferential direction including the weld of the steel pipe before pipe expansion in a pipe expansion process δ satisfy the expression (3), $$(1+0.005t|\delta|) \text{ Hz} < 0.03584 \text{Hv}^2 - 25.34\text{Hv} + 4712 \quad (3).$$

(8) A high-strength steel pipe excellent in burst resistance according to the item (7), characterized in that the peaking amount δ satisfies the expression (4), $$|\delta| < 40/t \quad (4).$$

BRIEF DESCRIPTION OF THE DRAWINGS

FIG. 1 is a schematic illustration showing a process for producing a steel pipe by a UOE method.

FIG. 2 is a graph showing the relation between the ratio (R/r) of the radius of curvature at a portion in the vicinity of a weld before pipe expansion (R) to the radius of a steel pipe after pipe expansion (r) and the occurrence or not of a rupture at the seam weld during pipe expansion.

FIG. 3 is an illustration showing a relationship between the radius of a steel pipe after pipe expansion (r) and the radius of curvature at a portion in the vicinity of a weld before pipe expansion (R).

FIG. 8 is a graph showing the result obtained by analyzing a strain in the tensiletest.

FIG. 9 is a schematic illustration showing the height of the shrinkage allowance of a weld metal at an inner surface.

BEST MODE FOR CARRYING OUT THE INVENTION

Figure 4:
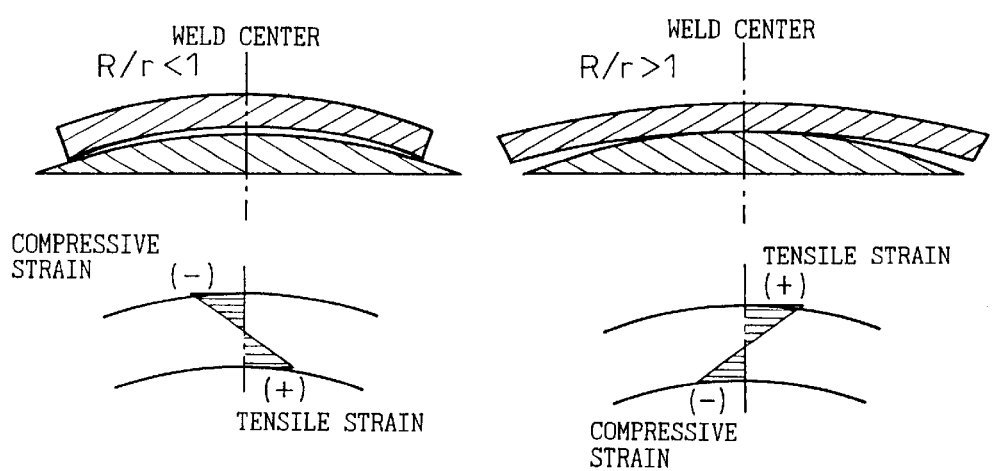
FIG. 4 consists of illustrations showing a relationship between a segment for pipe expansion during pipe expansion and the radius of curvature at a portion in the vicinity of a weld before pipe expansion (R), and the status of the occurrence of a strain (polarity) during the pipe expansion.

Firstly, in order to understand the mechanism of generating cracking and rupture at a seam weld in a pipe expansion process when a high-strength steel pipe exceeding 850 N/mm² in tensile strength was formed by a UOE method, the present inventors produced steel pipes whose curvatures were variously changed and investigated the occurrence or not of a rupture from a weld when pipe expansion was applied under the condition that the pipe expansion ratio was 1%. As a result, it was found that the occurrence or not of a rupture from a weld during pipe expansion was related to the radius of curvature in the vicinity of a weld before pipe expansion and the radius of the steel pipe after pipe expansion. FIG. 2 shows the relation between the ratio (R/r) of the average radius of curvature in the range of 120 mm in the circumferential direction with the weld of a steel pipe before pipe expansion (after O-pressing and seam welding) as the center (R) to the radius (average circle-equivalent radius) of the steel pipe after pipe expansion (r) and the occurrence or not of a rupture (expressed by the mark ◇ when a rupture does not occur during pipe expansion and by the mark ● when a rupture occurs during pipe expansion) from the weld during pipe expansion. Here, the radius of a steel pipe after pipe expansion (r) was varied by properly adjusting the curvature at C-pressing and the upset amount at O-pressing.

From FIG. 2, it was clarified that a rupture occurred at a weld during pipe expansion when R/r was less than 0.65 or over 2.0 but a rupture did not occur when R/r was in the range from 0.65 to 2.0.

Further, it was clarified that the influence of the strain concentration on a weld when a pipe expansion ratio was increased during pipe expansion was far less than that of the average radius of curvature in the vicinity of the weld of a steel pipe before pipe expansion (R), the radius of the steel pipe after pipe expansion (r) or the like, and that the cracking property of a weld during pipe expansion was substantially dominated merely by the curvature ratio (R/r).

FIG. 3 is an illustration showing the relation of the positions between the radius of a steel pipe after pipe expansion (r) and the average radius of curvature in the range of 120 mm in the circumferential direction with the weld before pipe expansion as the center (R), when R/r is in the range between the lower limit (0.65) and the upper limit (2.0) where a rupture does not occur at a weld during pipe expansion.

From the result obtained by observing the ruptured sections, it was found that cracking and rupture were generated with the outer side of a weld as the starting point of rupture during pipe expansion when R/r was larger than the upper limit 2.0 and with the inner side of a weld as the starting point of rupture when R/r was smaller than the lower limit 0.65; respectively.

Therefore, the present invention determines the ratio (R/r) of the average radius of curvature in the range of 120 mm in the circumferential direction with the weld of a steel pipe before pipe expansion (after O-pressing and seam welding) as the center (R) to the radius (average circle-equivalent radius) of the steel pipe after pipe expansion (r) to be 0.65 to 2.0, in order to suppress the cracking and rupture of the weld during pipe expansion when the steel pipe is produced. By so doing, the cracking and rupture at a seam weld, which are generated in a pipe expansion process when a high-strength steel pipe exceeding 850 N/mm² in tensile strength is formed by a UOE method, can be suppressed and the formability and the production efficiency of a high-strength steel pipe can be improved.

A steel pipe such as a line pipe used in an environment where an internal pressure is imposed is desired not to incur not only cracking and rupture at the weld but also rupture from the weld in an environment where an internal pressure load is imposed during its service. As a criterion, it is desirable that no rupture from a weld but only a rupture of a pipe body (base metal) occurs when a steel pipe is subjected to a burst test.

Further, the present inventors carried out a hydraulic pressure burst test, using steel pipe products which satisfied the above-mentioned condition that R/r was in the range from 0.65 to 2.0 and thus had a good formability, without incurring cracking and rupture at the welds during pipe expansion.

Figure 5:
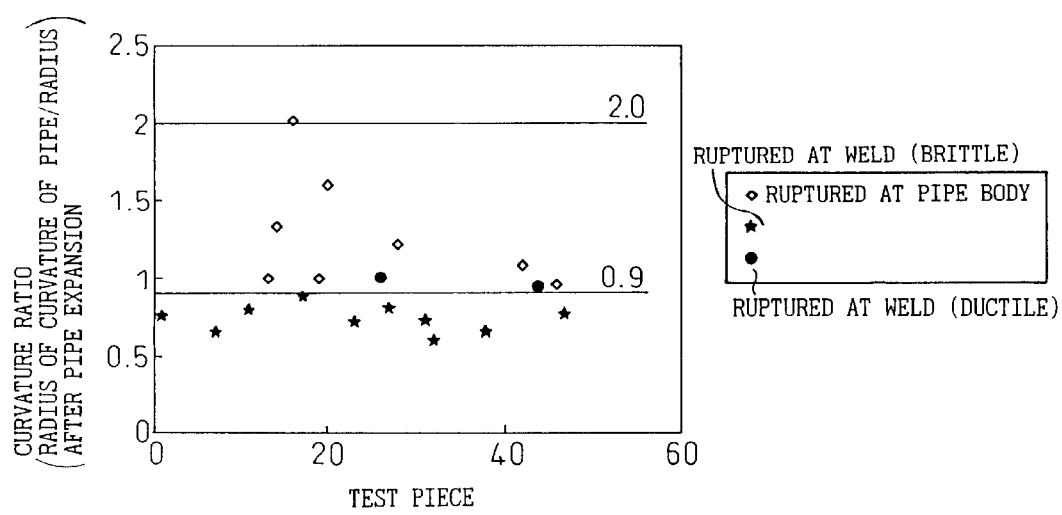
FIG. 5 is a graph showing the relation between the ratio (R/r) of the radius of curvature at a portion in the vicinity of a weld before pipe expansion (R) to the radius of a steel pipe after pipe expansion (r) and the form of a rupture in a hydraulic pressure burst test.

FIG. 5 shows the relation between the ratio (R/r) of the average radius of curvature in the range of 120 mm in the circumferential direction with the weld of a steel pipe before pipe expansion (after O-pressing and seam welding) as the center (R) to the radius (average circle-equivalent radius) of the steel pipe after pipe expansion (r) and the occurrence or not of a burst (expressed by the mark ◇ when a rupture occurs at a pipe body, by the mark ● when a ductile rupture occurs at a weld and by the mark ★ when a brittle rupture occurs at a weld) when the steel pipe products are subjected to a hydraulic pressure burst test. From FIG. 5, it was found that a burst (rupture) from a weld occurred when R/r was less than 1 and a burst (rupture) from a pipe body occurred when R/r was 1 or more.

FIG. 4 shows the relation of the positions between a segment (the radius of curvature corresponds to the radius of a steel pipe (r)) for pipe expansion which is used during pipe expansion and the average radius of curvature in the range of 120 mm in the circumferential direction with the weld before pipe expansion as the center (R), and the status of a strain generated during the pipe expansion. From FIG. 4, it was understood that the tensile strain caused by bending during pipe expansion concentrated on the inner side of a steel pipe under the condition that R/r was less than 1 and the tensile strain caused by bending during pipe expansion concentrated on the outer side of a steel pipe under the condition that R/r was 1 or more.

In addition, as a result of a numerical analysis with the finite element method by the present inventors, it was found that, under the condition that R/r was less than 1, an excessive plastic strain remained at each of the toes of the weld at the inner surface of a steel pipe caused by a bending load during pipe expansion and the amount of the plastic strain exceeded 25%. Therefore, it is considered that the mechanism of the burst at the weld of a steel pipe is as follows: when a steel pipe is subjected to pipe expansion under the condition that R/r is less than 1 during the forming of the steel pipe, an excessive plastic strain remains at the weld of the steel pipe, the amount of tensile strain caused by the internal pressure load of the pipe during the use of the steel pipe is added to the amount of the residual strain, the total strain reaches the critical rupture strain and, as a result, a burst (rupture) occurs from the toes of the weld. On the other hand, when R/r is 1 or more, the residual strain at a weld caused by bending during pipe expansion acts on the compression side, thus the amount of the strain remaining at the toes of the weld on the inner side of the weld after pipe expansion goes down even in a compressive environment or a tensile environment, as a result, the amount of the plastic strain becomes overwhelmingly smaller than that of a steel pipe expanded under the condition that R/r is less than 1 during the forming of the steel pipe even when the amount of the tensile strain caused by the internal pressure load of the pipe during the use of the steel pipe is added to the amount of the residual strain, and therefore a burst (rupture) from the inner side of the weld during the use of the steel pipe is suppressed. Note that, in this case, though a rupture from the outer side of the weld of a steel pipe is apt to occur, as the state of the stress of the steel pipe when an internal pressure is loaded on the steel pipe during the use of the steel pipe is such that the strain of the outer side is more mitigated than that of the inner side, the strength of the weld against a rupture improves as a whole.

As explained above, by adjusting the condition of R/r during pipe expansion when a steel pipe is produced, it is made possible to control the amount of a strain (the amount of a residual strain) generated at each of the toes of a weld at the inner and outer surfaces of a steel pipe during pipe expansion, and by adjusting the polarity of the strain, to reduce the amount of the critical rupture plastic strain generated caused by an internal pressure load during the use of the steel pipe, and to suppress a burst at the weld (to attain the burst of the pipe body).

Further, the ruptured sections of the test pieces which had burst from the welds in a hydraulic pressure burst test were observed, and it was found that the rupture was a ductile rupture in the case of the test pieces having R/r of 0.9 or more to less than 1.0 and the same was a brittle rupture in the case of the test pieces having R/r of less than 0.9.

In case of a steel pipe for line pipe use, a brittle rupture in particular, among the forms of cracking from welds, must be avoided, because a brittle rupture has a high cracking propagation velocity and a low cracking propagation stopping capability and thus is a factor in causing a large breakage of a line pipe. For this reason, the present invention determines the ratio (R/r) of the average radius of curvature in the range of 120 mm in the circumferential direction with the weld of a steel pipe before pipe expansion (after O-pressing and seam welding) as the center (R) to the radius (average circle-equivalent radius) of the steel pipe after pipe expansion (r) to be 0.9 to 2.0, in order to suppress a brittle rupture at the weld of the steel pipe in the environment where the steel pipe is used for a line pipe. Preferably, in order to perfectly avoid a rupture from the weld of a steel pipe in the environment where the steel pipe is used for a line pipe, R/r must be determined to be 1.0 to 2.0.

Figure 6:
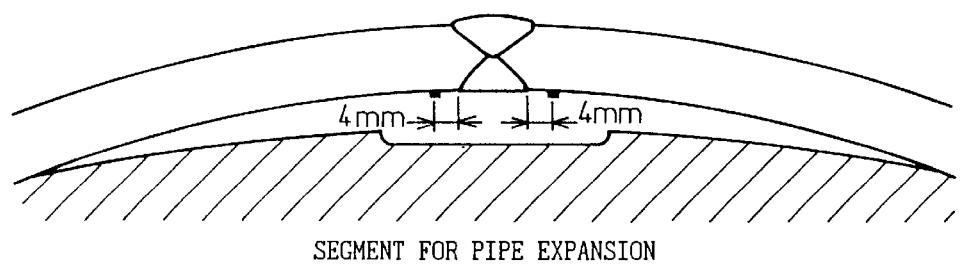
FIG. 6 is an illustration showing the method of measuring a strain during pipe expansion.

Further, in the present invention, based on the knowledge that the pipe expansion cracking during pipe expansion and the seam burst during the use of a steel pipe were originated from the toes of a weld at the inner surface and that an angular distortion influenced burst resistance, strain gages were attached to the points 4 mm apart from the toes of the weld at the inner surface of a steel pipe as shown in FIG. 6 and the strains in the circumferential direction during pipe expansion were measured. The strains were measured until the strains reached the maximum pipe expansion ratio continuously during pipe expansion or until pipe expansion cracking occurred. When R/r was 1 or less, the strains simply increased to the tensile side in general and, when R/r was 1 or more, the strains once took the state of compression and then turned to the tensile side. Here, the maximum strain amounts and the forms of ruptures were compared in the pipe expansion process. As a result, when a tensile strain exceeded 4%, pipe expansion cracking from a weld occurred in many test samples. Based on that, the present inventors invented a technology that made it possible to prevent pipe expansion cracking by controlling the absolute value of a strain at a point 4 mm apart from each of the toes of a weld to 4% or less.

Some steel pipes among those that succeeded in pipe expansion were subjected to a hydraulic pressure burst test, and the strains measured during pipe expansion and the forms of burst ruptures were compared. As a result, it was found that a burst occurred from a seam weld frequently when a pipe expansion strain exceeded 2.5%. On the other hand, a burst occurred from a pipe body without exception when a pipe expansion strain was 2.5% or less. Therefore, by controlling the absolute value of a strain at a point 4 mm apart from each of the toes of a weld to 2.5% or less, it is made possible to supply a steel pipe which is prevented from ruptureing at a seam weld caused by a burst when an inner pressure is imposed.

The reasons why the position where a strain is controlled is determined to be a point 4 mm apart from each of the toes of the weld at an inner surface are as follows: the measurement of a strain is not affected by C-pressing, U-pressing or O-pressing in the vicinity of an edge of a sheet; the critical equivalent plastic strain amount which can be used as an indicator of the generation of ductile cracking is not affected by other production processes; the strain amount measured at the position can represent the macroscopic strain amount in the vicinity of each of the toes of a weld; and a softened band of a HAZ exists at a position 2 to 3 mm apart from each of the toes of a weld and the measurement of a strain by attaching a strain gage there is apt to produce an error. It is also possible to set the position of strain measurement at a position more distant from a 4 mm apart position though the accuracy is inferior, and in that case, the strain may be controlled with the inverse proportion to the distance from each of the toes of a weld.

Figure 7:
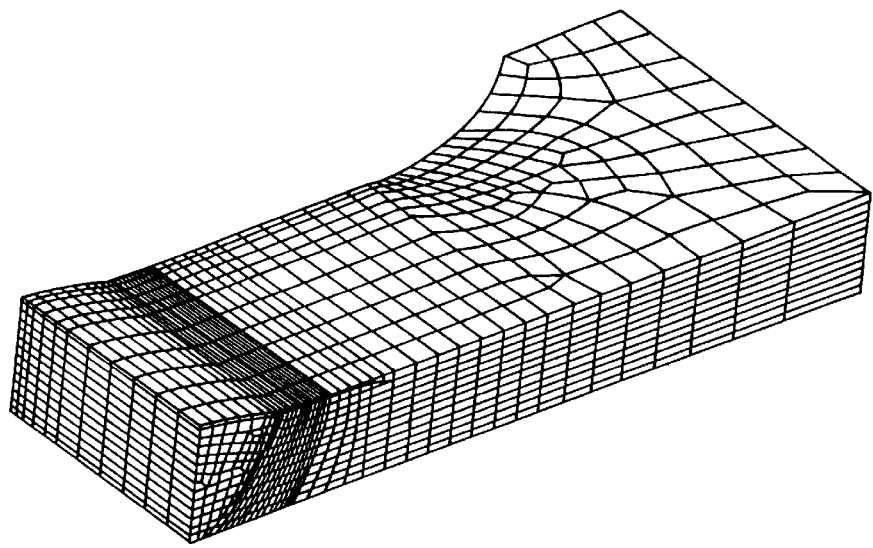
FIG. 7 is an illustration showing a model of a welded joint used for the finite element method.

The present inventors ran a numerical analysis simulation with the finite element method (hereunder referred to as "FEM") in order to investigate the influence of the shape of a weld, the strength of a base metal, the strength of a weld metal, the strength of a HAZ and the width of a HAZ on the strength of a weld joint. Table 1 shows the analysis conditions, FIG. 7 the model of the weld joint used for FEM on the scale of one fourth, and FIG. 8 the result of the calculation.

TABLE 1

FIG. 8 shows that a joint breaks when an equivalent plastic strain reaches a critical limit. When the displacements are identical, that a strain amount is larger means that the strain is concentrated more. From this fact, it is understood that, even if the shapes of bevels are identical, the higher the height of the reinforcement of a weld metal is, the more the concentration of the strain is, and, even if the heights of weld metals are identical, the larger the bevel angle is, the less the concentration of the strain is. The slight variation in the critical strain amount in each case is caused by the influence of the degree of a triaxial stress. It was found that, only in case 2, the equivalent plastic strain reached the critical strain, but, in cases 1 and 3, the strain concentrated on the base metal before the equivalent plastic strain at each of the toes of the weld reached the critical strain and thus no rupture occurred at the weld.

Figure 10:
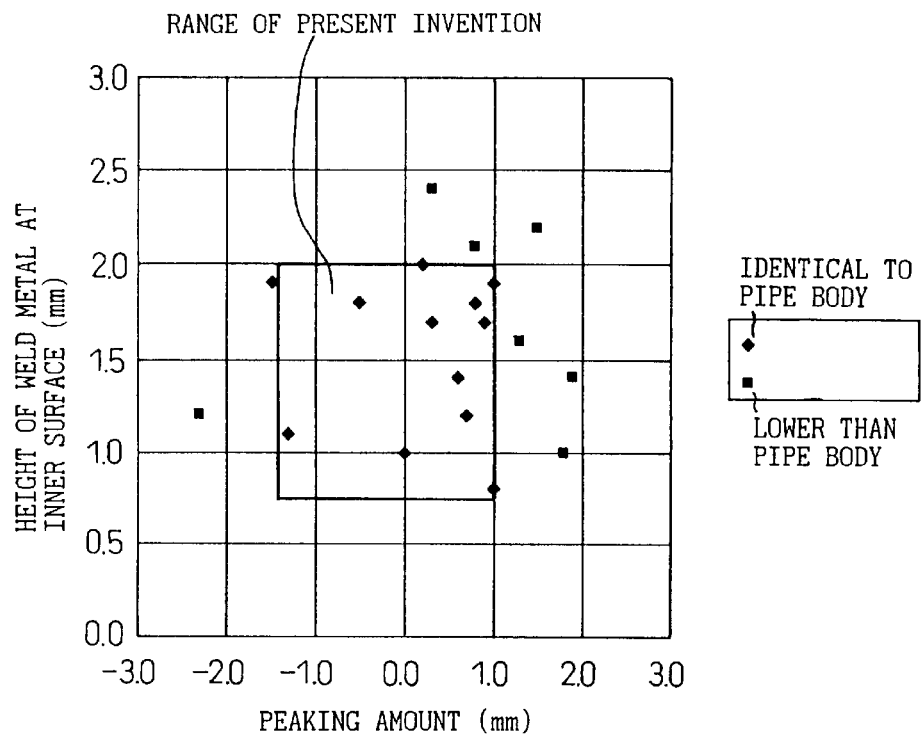
FIG. 10 is a graph showing the influence of a peaking amount, and the height of a weld metal at an inner surface, on burst resistance.
Figure 11:
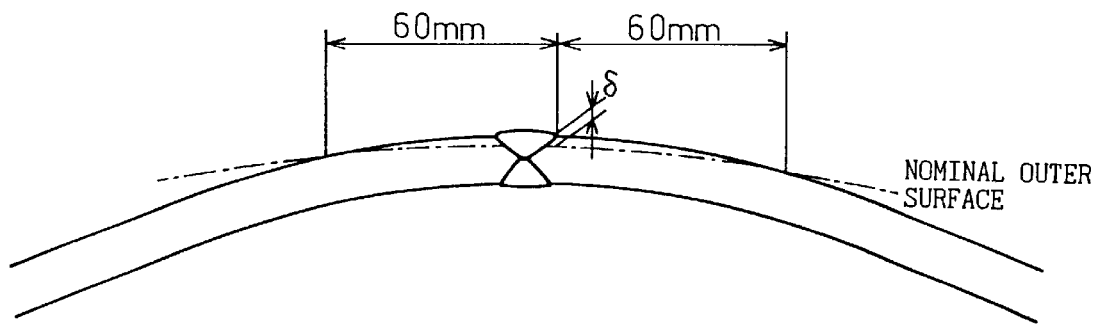
FIG. 11 is an illustration explaining the definition of a peaking amount.

Then high-strength steel pipes 914 mm in outer diameter and 16 mm in wall thickness were subjected to an inner pressure burst test while the height of the reinforcement of the deposited metal at the inner surface of each of the welds was varied. As a result, the form of a rupture was not always the form of the rupture dependent on the height of the reinforcement of a deposited metal. Here, the height of the reinforcement of a weld metal means the height thereof from the inner surface of a pipe as shown in FIG. 9. As a result of observing the ruptured sections of the test samples which ruptured from the welds, it was found that most of the test samples incurred brittle ruptures or ductile ruptures which originated from the inner surfaces and the bursts occurred at a certain stage in the process of raising pressure, according to the graph showing the relation between the inner pressure and the time. This means that the withstanding pressure of a welded steel pipe is lower than that intrinsic to a base metal (lower than the withstanding pressure of a pipe body). The relation between a peaking amount and the height of a weld at an inner surface is shown in FIG. 10 based on the presupposition that a rupture is apt to occur because a plastic strain concentrates at each of the toes of a weld at an inner surface during pipe expansion when a positive peaking exists before pipe expansion as stated above. Here, a peaking amount is defined based on FIG. 11. That is, a peaking amount is defined as the distance between a toe of a weld and the nominal outer surface of a pipe prepared so as to cross the actual outer surface of the pipe at the positions 60 mm distant from either of the toes of the weld. When a peaking amount is measured after tackwelding, the peaking amount may be defined by the distance between an edge of a bevel and the nominal outer surface. As a result, it was found that, even though the height of a metal at an inner surface was 2.0 mm or less, the burst pressure was lower than the withstanding pressure of a pipe body when the peaking amount exceeded 1.0 mm.

On the other hand, when test samples 2.0 mm or less in height of a metal at an inner surface and 1.0 mm or less in peaking amount were subjected to a hydraulic pressure burst test, the increase of the pressure with the lapse of time was not observed in spite of the boosting of the pressure by a pump, and the test samples broke either directly or after a slight reduction in the pressure. This means that the stress of the base metal has reached the tensile strength, the withstanding pressure is sufficient for a practical use, and the weld has a withstanding pressure identical to that of the pipe body.

Based on this, the present inventors discovered that a burst strength identical to that of a pipe body could be obtained by controlling the height of a weld metal at an inner surface to 2.0 mm or less and a peaking amount before pipe expansion to 1.0 mm or less. That is, a peaking amount must satisfy the expression; $-1.5$ mm $\leq$ peaking amount (mm) $\leq 1.0$ mm.

When a peaking amount was lower than $-1.5$ mm, a burst occurred with a pressure lower than the withstanding pressure of a pipe body even if the height of a weld metal at an inner surface was within the range specified in the present invention. As a result of investigating the ruptured section, it was clarified that the rupture originated from the outer surface of the weld metal. Therefore, the effects of the present invention are not demonstrated when a peaking amount is lower than $-1.5$ mm. Generally speaking, the bevel stability during O-pressing deteriorates as a peaking amount goes down towards a negative value and, if a peaking amount is lower than $-2.0$ mm, buckling is apt to occur and stable forming is hardly attained in a mass production.

Figure 12:
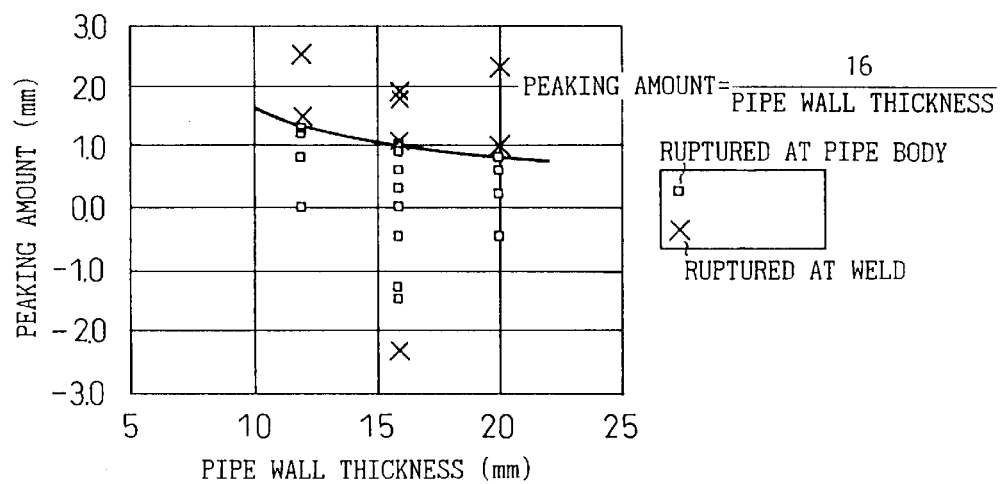
FIG. 12 is a graph showing the relation between a pipe wall thickness and a critical peaking amount.

Next, the present inventors investigated whether or not the ranges specified in the present invention could be applicable to a pipe having another wall thickness and outer diameter. FIG. 12 shows the result of the burst test in the case where the height of the reinforcement at an inner surface is 2.0 mm or less. The thicker the wall thickness is, the lower the critical peaking amount is, and a positive peaking amount in which a withstanding pressure identical to that of a pipe body is obtained is determined by the value of 16/pipe wall thickness (mm). That is, a peaking amount must satisfy the expression; $-1.5$ mm $\leq$ peaking amount (mm) $\leq 16$/pipe wall thickness (mm). It is desirable to control a peaking amount in the range from 0 to 16/pipe wall thickness (mm) in order to secure a stable production also in a mass production.

Figure 13:
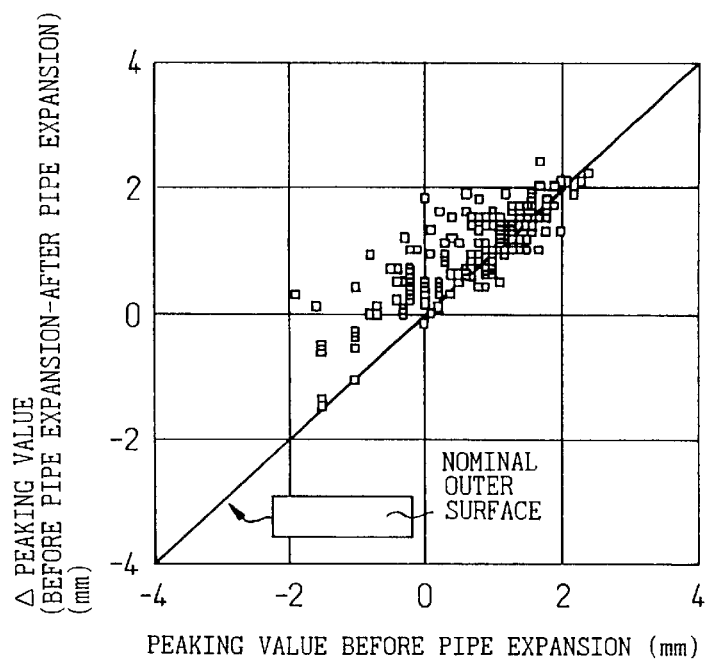
FIG. 13 is a graph showing a peaking amount before pipe expansion and the difference in the peaking amount between before and after the pipe expansion.

The rupture at the seam weld of a test sample having had a positive peaking value before pipe expansion originated from the inner surface, and the rupture of a test sample having had a negative peaking value originated from the outer surface. The present inventors thought that the resistance of a weld against a rupture by burst was caused by the concentration of a plastic strain on the toes of the weld and the HAZ and further the absolute value thereof mainly depended on the amount of change in peaking amount from before pipe expansion to after pipe expansion. Based on that, the peaking amounts before and after pipe expansion were measured and the relation between a peaking amount before pipe expansion and the amount of change in the peaking amount from before pipe expansion to after pipe expansion was obtained as shown in FIG. 13. From the figure, it was found that, though the peaking before pipe expansion came close to the nominal surface of a pipe, which constituted the target curvature, by applying pipe expansion, the data largely distributed in the direction of too large correction (to the side where the amount of change in the peaking amount was larger than the line showing the nominal surface of a pipe in FIG. 13).

Figure 14:
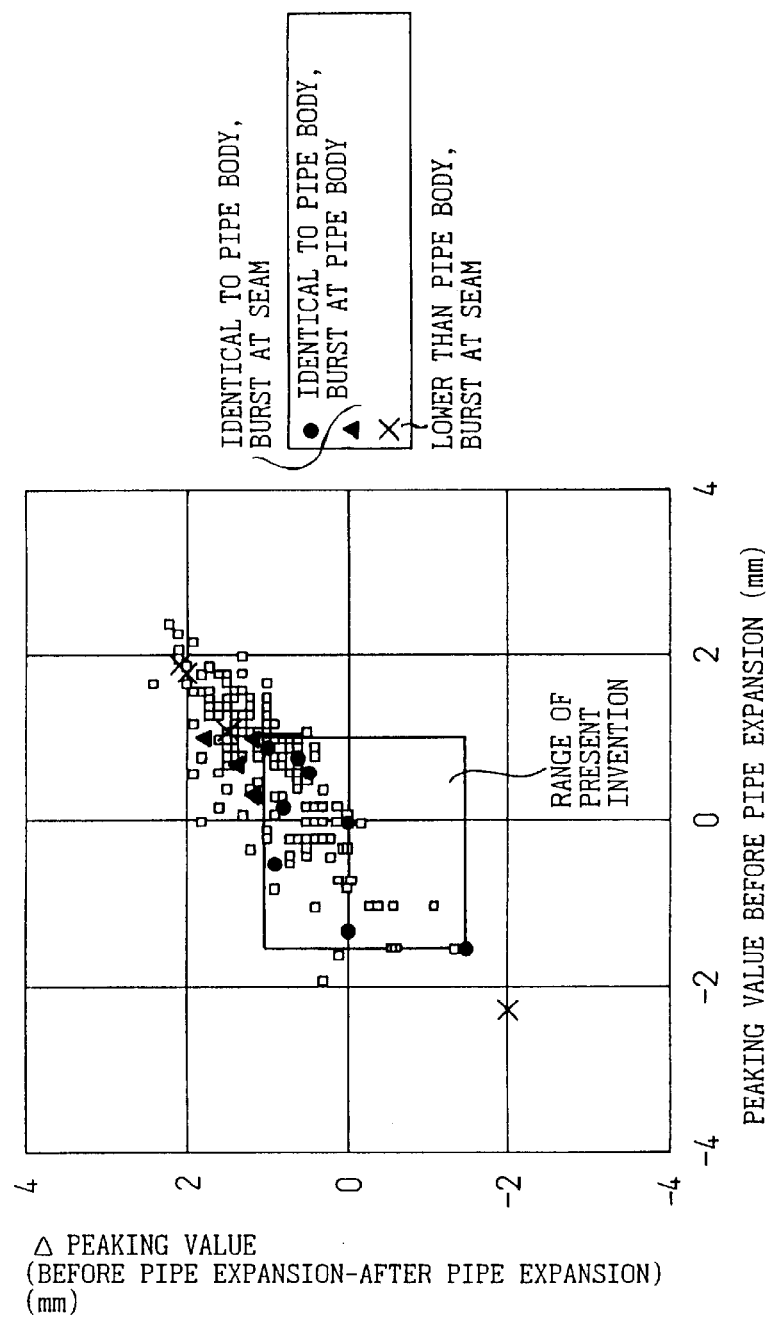
FIG. 14 is a graph showing the relation between the change in the peaking amount from before pipe expansion to after pipe expansion and the form of a burst rupture.

Among the test samples, the test samples each having the reinforcement 2.0 mm or less in height at the inner surface of the weld were extracted and were subjected to a burst test. The results are shown in FIG. 14, taking the test samples 914 mm in diameter and 16 mm in thickness as examples. The test pieces were classified into the following three categories in relation to the withstanding pressures and the forms of ruptures: the ones which had the withstanding pressures lower than those of the pipe bodies and incurred seam bursts; the ones which had the withstanding pressures identical to those of the pipe bodies and incurred seam bursts; and the ones which had the withstanding pressures identical to those of the pipe bodies and incurred bursts from the pipe bodies. As a result, it was found that, even though the peaking amounts before pipe expansion were in the range from $-1.5$ to 1.0 mm, the test samples having the amounts of change in peaking amount exceeding 1 mm during pipe expansion incurred seam bursts, but the test samples having the amounts of change in peaking amount in the range from 1 mm or less to $-1.5$ mm or more incurred bursts from the pipe bodies.

The reason why the burst resistance improves as the amount of change in peaking amount reduces is that the amount of change in peaking amount most affects the concentration of a strain on a weld. The reason why the allowance of a peaking amount is larger on the negative side is that the compressive strain caused by angular distortion is offset against the tensile strain in the circumferential direction and, as a result, the amount of equivalent plastic strain reduces.

Besides a peaking value, the pipe expansion ratio is given as an indicator of formability showing the concentration of a strain on a weld. However, in order to secure the roundness of a whole pipe, the pipe expansion ratio cannot be lowered, and, in order to control the roundness, as defined by the American Petroleum Institute, to within ±1% of a nominal diameter, it is necessary to secure the pipe expansion ratio of 0.7% or more. Usually a pipe expansion ratio of 0.8 to 1.2% is employed. The angular distortion for correcting a peaking makes the concentration of a strain on each of the toes of a weld or a HAZ far larger than the increment of a strain caused by the increment of the pipe expansion ratio, and therefore it may be said that the strength at a weld is substantially dominated by a peaking.

Then the present inventors flattened the test pieces containing the welds of high-strength steel pipes exceeding 900 N/mm² in tensile strength and subjected them to a tensile test in the direction perpendicular to the weld lines. As a result, in case of medium-strength materials (X-65, X-80) and high-strength materials (800 N/mm² class in tensile strength), the test pieces ruptured from the base metals and, in case of a steel pipe exceeding 900 N/mm² in tensile strength, the test pieces mostly ruptured from the welds. Further, as a result of observing the ruptured sections in detail, it was found that there were two forms of ruptured sections, namely ductile ruptures and brittle ruptures. Here, the conditions of the forming, the strength of he base metal, the strength of the HAZ, the shape of the weld, the conditions of the welding and the like of each test piece were analyzed in detail. As a result, it was found that a brittle ruptured section and a ductile ruptured section could be differentiated by maintaining the relation between the Vickers hardness of a base metal and that of a HAZ within a specific range. Here, the Vickers hardness of a base metal is represented by the average hardness of the pipe body material on the side where a rupture at a weld originates, and the Vickers hardness of a HAZ is meant as the minimum hardness at the HAZ on the side where a rupture at the weld of a pipe originates and the position showing the minimum hardness exists generally within 3 mm from each of the toes of a weld. The starting point of a rupture at a weld has a close relation with a peaking amount before pipe expansion, and, in case of a positive peaking amount, a rupture originates at the inner surface and, in case of a negative peaking amount, it originates at the outer surface. That is, as long as the hardness of a base metal, the hardness of a HAZ, a peaking amount and a pipe wall thickness satisfy the following expression (3), the ruptured section shows a ductilely ruptured section:

$$(1+0.005t|\delta|)Hz < 0.03584Hv^2 - 25.34Hv + 4712 \tag{3}$$

where,

Hv: Vickers hardness of base metal,

Hz: Vickers hardness of HAZ,

δ: peaking amount before pipe expansion, mm, t: pipe wall thickness, mm.

The present inventors perceived that the position of a rupture varied depending on allowance in peaking amount and that the magnitude of the peaking amount affected the form of a rupture, and deduced the expression (3). When a peaking amount is positive, a strain concentrates predominantly on a HAZ at an inner surface during pipe expansion, but, when a peaking amount is negative, a strain concentrates predominantly on a HAZ at an outer surface. When a steel pipe thus having incurred a plastic strain is flattened and then subjected to a tensile test, the influence of the plastic strain having remained during pipe expansion is predominant and the starting point of cracking is generated depending on allowance in peaking amount. A large peaking amount means that a plastic strain amount incurred during pipe expansion is large, and it is estimated that, when such a test piece is subjected to a tensile test, the base metal reaches the critical strain amount without generating predominant elongation, ductile cracking occurs, and, right after that, a brittle rupture occurs. The present inventors analyzed an equivalent plastic strain amount generated at a HAZ during pipe expansion with FEM and confirmed that the equivalent plastic strain amount exceeded 25% and there was no allowance to the critical strain amount.

Figure 15:
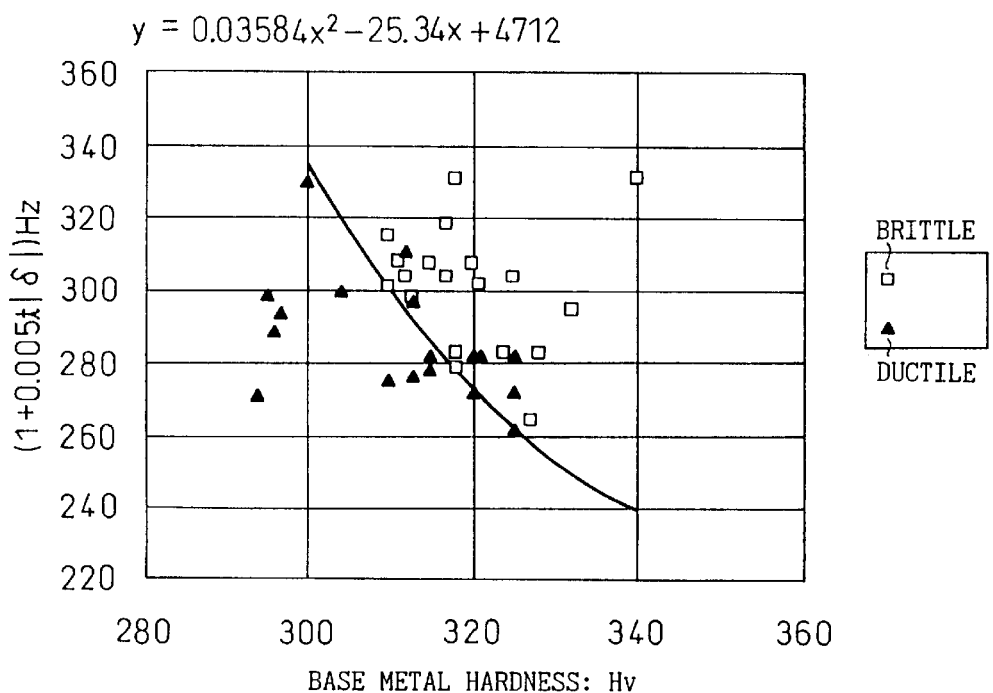
FIG. 15 is a graph showing the classification of the form of a rupture in the tensile test of a joint in relation to the hardness of a base metal and that of a HAZ.
Figure 16:
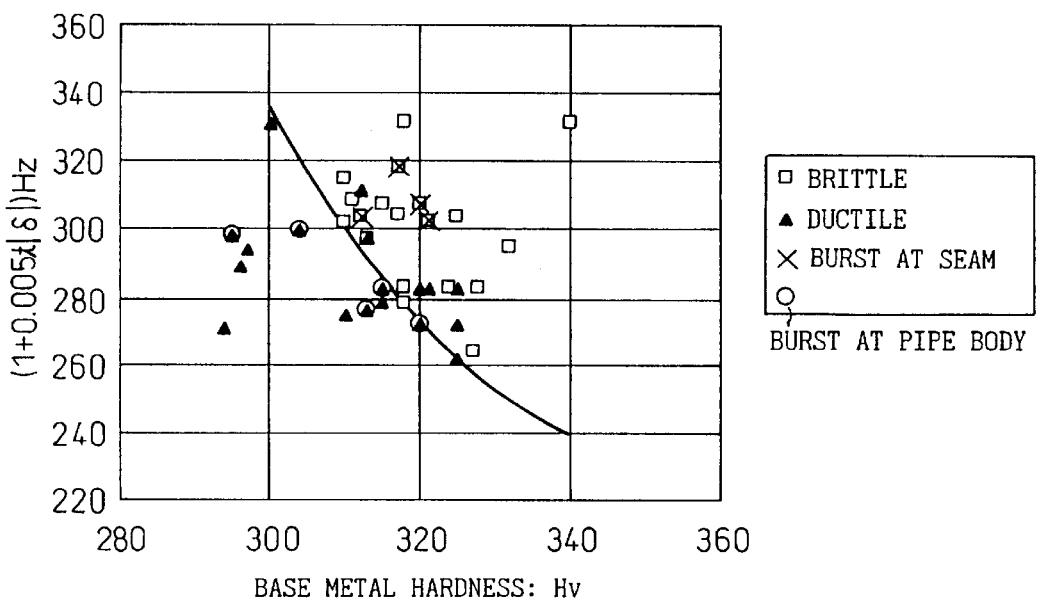
FIG. 16 is a graph showing the classification of the form of a rupture in a burst test in relation to the hardness of a base metal and that of a HAZ.

Then, steel pipes, each of which being cut out from the place adjacent to the place where a test piece for tensile test of a weld joint was taken, were subjected to an inner pressure burst test. FIG. 16 shows the fracture portion obtained by subjecting the steel pipes 914 mm in outer diameter and 16 mm in wall thickness tothe burst test, together with the results of the tensile test of weld joints shown in FIG. 15. The forms of ruptures in the burst test are classified into two categories; a rupture from a weld and a rupture at a pipe body. The test pieces which showed the ruptures at the pipe bodies corresponded with the steel pipes which showed ductilely ruptured sections in the tensile test of the weld joints and the test pieces which showed the ruptures at the seam welds corresponded with the steel pipes which showed brittlely ruptured sections in the tensile test of the weld joints. That is, it was found that the classification of the forms of ruptured sections obtained by the tensile test of weld joints corresponded with the classification of the fracture portion in the burst test of actual pipes. Based on the above findings, the present inventors found that a burst at a pipe body could be attained by controlling the hardness of a base metal, the hardness of a HAZ and a peaking amount so as to satisfy the expression (3).

With respect to concrete control methods, a hardness can be controlled by controlling the chemical composition of a base metal itself and water-cooling commencement and termination temperatures, a cooling rate, a welding heat input in TMCP and the like, and a peaking amount can be controlled by controlling a curvature during C-pressing, a width during U-pressing, an upsetting ratio during O-pressing and the like.

Figure 18:
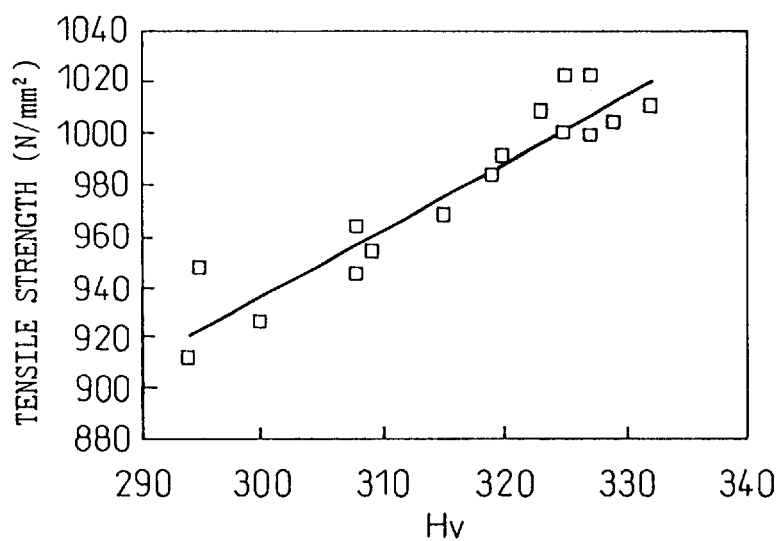
FIG. 18 is a graph showing the relation between a Vickers hardness and a tensile strength.

The reason why the range of the strength of a base metal is determined to be 900 N/mm² or more is that, in case of a steel pipe of 800 N/mm² class, the degree of the softening of a HAZ against a base metal is not large enough, a strain concentrates on the HAZ during pipe expansion, and that leads easily to a rupture at the pipe body during a burst test even though the steel pipe is hardened. In this connection, the present inventors investigated the relation between a hardness and a tensile strength and obtained the relation shown in FIG. 18.

Next, the present inventors studied concrete production indicators by which the expression (3) could easily be satisfied. In case of a high-strength steel pipe exceeding 900 N/mm² in tensile strength, as the steel pipe is apt to generate cracking at seam weld during pipe expansion, it is necessary to produce a steel pipe which does not generate pipe expansion cracking as a prerequisite of satisfying the expression (3). A pipe forming test was carried out using the test samples having the pipe expansion ratio of 0.8 to 1.2% and various wall thickness and outer diameters.

Figure 17:
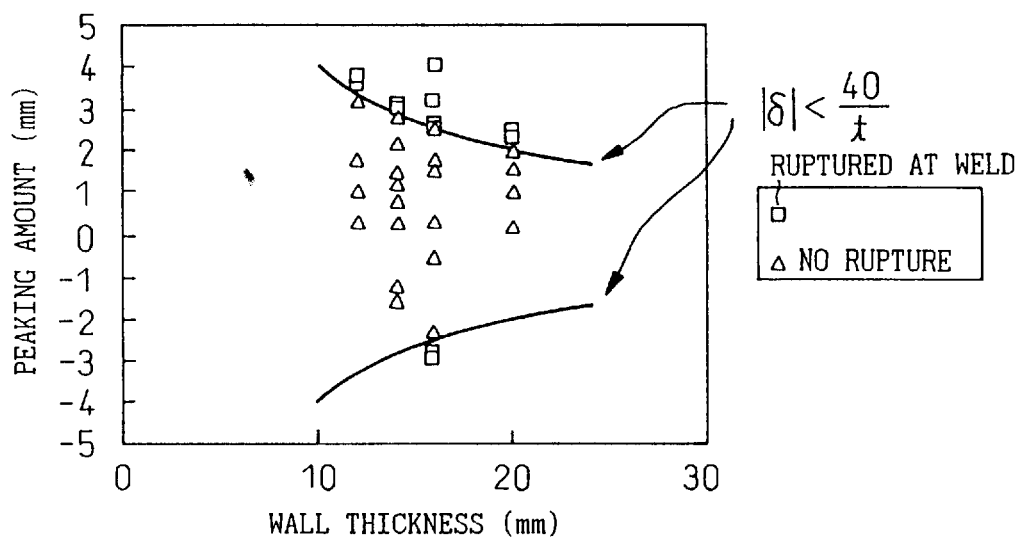
FIG. 17 is a graph showing the classification of the occurrence or not of a rupture during pipe expansion in relation to a wall thickness and a peaking amount.

FIG. 17 shows the test samples which incurred pipe expansion cracking and the test samples which were successful in pipe expansion without incurring cracking at the welds in relation to the pipe body wall thickness. It was found that pipe expansion cracking could be prevented very accurately if the relation between a peaking amount and a wall thickness satisfies the following expression (4), $$|\delta| < 40/t \tag{4}$$

The reason why a critical peaking amount is in inverse proportion to a wall thickness is that the strain amount concentrating at each of the toes of a weld tends to increase in proportion to the wall thickness. The reason why the number of tested samples is small on the negative peaking side is that the test samples having negative peaking amounts generate the buckling of the bevels during O-pressing. The test samples could be used for the test of this time by varying the curvatures in the axial direction of the pipes during C-pressing or using a bucking prevention device during O-pressing.

EXAMPLES

The examples are explained hereunder.

Example 1

With regard to the invented examples and comparative examples in Example 1, steel pipes were prepared by varying the specifications of the steel pipes, such as the steel sheet strength, the diameter after forming and the wall thickness, and also varying the forming conditions of the steel pipes, such as the curvature in the range of 120 mm with a weld before pipe expansion as the center R, the radius of a steel pipe after pipe expansion at a specific expansion ratio r and the ratio R/r, as shown in Table 2. Then, with regard to the steel pipes thus prepared, the status of a rupture at a seam weld during pipe expansion was observed, and, with regard to some of the steel pipes, the status of a rupture, the position of a rupture and the form of a ruptured section in a hydraulic pressure burst test were also observed. The results of the observations are shown also in Table 2. Further, the steel pipes 914.4 and 711.2 mm in outer diameter and 16, 12, 20 and 14 mm in wall thickness were subjected to a hydraulic pressure burst test and the peaking values, the heights of the reinforcement of the weld metals at the inner surfaces, the rupture strength and the fracture portion were observed. The results of the observations are shown in Table 3.

As it was understood from Tables 2 and 3, though none of the steel pipes of the invented example Nos. 1 to 18 ruptured from the seam weld during pipe expansion, some of the steel pipes ruptured from the seam welds or the pipe bodies in the hydraulic pressure burst test and the ruptured sections were ductilely ruptured sections. On the other hand, any of the steel pipes of the comparative example Nos. 1 to 5 ruptured from the seam weld during pipe expansion and could not be formed into a steel pipe. Further, though none of the steel pipes of the comparative example Nos. 6 to 9 ruptured from the seam weld during pipe expansion, some of the steel pipes ruptured from the seam welds in the hydraulic pressure burst test and the ruptured sections were brittle ruptured sections.

TABLE 1

Conditions of analysis with finite element method

| Case | Height of reinforcement of weld metal at inner surface (mm) | Bevel angle (degree) | Base metal strength (MPa) | Deposited metal strength (MPa) | Softened width of HAZ (mm) |
|---|---|---|---|---|---|
| 1 | 1.4 | 40 | 940 | 1050 | 2 |
| 2 | 2.3 | 40 | | | |
| 3 | 1.4 | 50 | | | |

TABLE 2

| | Specification of steel pipe | | | Forming conditions | | | | | | |
|---|---|---|---|---|---|---|---|---|---|---|
| | Steel sheet strength (N/mm²) | Outer diameter after forming (mm) | Wall thickness (mm) | Curvature in the range of 120 mm with weld before pipe expansion as the center R (mm) | Pipe expansion ratio (%) | Steel pipe radius after pipe expansion r (mm) | R/r | Strain at 4 mm point on inner surface (%) | Status of seam during pipe expansion | Hydraulic pressure burst test result |
| Invented example | | | | | | | | | | |
| 1 | 1000 | 914 | 16 | 300 | 1.5 | 457 | 0.66 | 4.0 | No rupture | |
| 2 | 860 | 914 | 16 | 300 | 0.8 | 457 | 0.66 | 4.2 | No rupture | |
| 3 | 1050 | 914 | 16 | 320 | 0.8 | 457 | 0.70 | 3.2 | No rupture | |
| 4 | 1000 | 914 | 16 | 922 | 1.2 | 457 | 2.02 | −3.5 | No rupture | |
| 5 | 1020 | 914 | 11 | 315 | 1.2 | 457 | 0.69 | 2.6 | No rupture | |
| 6 | 1040 | 914 | 22 | 305 | 0.8 | 457 | 0.67 | 4.9 | No rupture | |
| 7 | 930 | 609.4 | 16 | 234 | 1.2 | 304.7 | 0.77 | 3.8 | No rupture | |
| 8 | 870 | 609.4 | 10.3 | 295 | 1.5 | 304.7 | 0.97 | 0.3 | No rupture | |
| 9 | 870 | 1118 | 12 | 364 | 1.8 | 559 | 0.65 | 2.6 | No rupture | |
| 10 | 950 | 1118 | 24 | 1105 | 1.8 | 559 | 1.98 | −1.8 | No rupture | |
| 11 | 1000 | 914 | 16 | 425 | 0.8 | 457 | 0.93 | 2.6 | No rupture | Ruptured from seam, ductilely ruptured section |
| 12 | 960 | 914 | 16 | 481 | 0.8 | 457 | 1.05 | 0.4 | No rupture | Ruptured from pipe body |
| 13 | 960 | 914 | 16 | 922 | 0.8 | 457 | 2.02 | −3.4 | No rupture | Ruptured from pipe body |
| 14 | 870 | 609.4 | 10.3 | 295 | 1.5 | 304.7 | 0.97 | 2.5 | No rupture | Ruptured from pipe body |
| 15 | 930 | 609.4 | 10.3 | 608 | 1.5 | 304.7 | 2.00 | −1.7 | No rupture | Ruptured from pipe body |
| 16 | 950 | 1118 | 24 | 1105 | 1.8 | 559 | 1.98 | −2.2 | No rupture | Ruptured from pipe body |

TABLE 2-continued

| | Specification of steel pipe | | | Forming conditions | | | | Strain | | |
| | | | | Curvature in the | | Steel pipe | | | | |
| | Steel sheet strength (N/mm²) | Outer diameter after forming (mm) | Wall thickness (mm) | range of 120 mm with weld before pipe expansion as the center R (mm) | Pipe expansion ratio (%) | Steel pipe radius after pipe expansion r (mm) | R/r | at 4 mm point on inner surface (%) | Status of seam during pipe expansion | Hydraulic pressure burst test result |
|---|---|---|---|---|---|---|---|---|---|---|
| 17 | 950 | 1118 | 24 | 512 | 1 | 559 | 0.92 | 2.9 | No rupture | Ruptured from seam, ductilely ruptured section |
| 18 | 950 | 1118 | 24 | 595 | 1 | 559 | 1.06 | 0.6 | No rupture | Ruptured from pipe body |
| Comparative example | | | | | | | | | | |
| 1 | 900 | 914 | 16 | 982 | 1 | 457 | 2.15 | −5.5 | Ruptured, failed in steel pipe forming | |
| 2 | 980 | 914 | 16 | 1089 | 1 | 457 | 2.38 | −5.8 | Ruptured, failed in steel pipe forming | |
| 3 | 980 | 914 | 11 | 252 | 1 | 457 | 0.55 | 4.5 | Ruptured, failed in steel pipe forming | |
| 4 | 900 | 609.4 | 16 | 191 | 1 | 304.7 | 0.63 | 6.2 | Ruptured, failed in steel pipe forming | |
| 5 | 900 | 1118 | 12 | 1353 | 1 | 559 | 2.42 | −4.9 | Ruptured, failed in steel pipe forming | |
| 6 | 1000 | 914 | 16 | 300 | 1.5 | 457 | 0.66 | 4.2 | No rupture | Ruptured, brittlely ruptured section |
| 7 | 930 | 609.4 | 16 | 234 | 1.2 | 304.7 | 0.77 | 3.7 | No rupture | Ruptured, brittlely ruptured section |
| 8 | 870 | 1118 | 12 | 364 | 1.8 | 559 | 0.65 | 2.8 | No rupture | Ruptured, brittlely ruptured section |
| 9 | 840 | 914 | 16 | 252 | 1 | 457 | 0.55 | 6.8 | No rupture | Ruptured, brittlely ruptured section |

TABLE 3

| Outer diameter (mm) | Wall thickness (mm) | Steel pipe strength (N/mm²) | Peaking value (mm) Before pipe expansion | Changed amount after pipe expansion | Height of reinforcement of weld metal at inner surface (mm) | Rupture strength | Fracture portion | Remarks |
|---|---|---|---|---|---|---|---|---|
| 914.4 | 16 | 1010 | 0.3 | 1.2 | 1.7 | Identical to pipe body | Burst at seam | Invented example |
| | | 955 | 0.6 | 0.5 | 1.4 | Identical to pipe body | Burst at pipe body | Invented example |
| | | 1010 | 1.0 | 1.2 | 0.8 | Identical to pipe body | Burst at seam | Invented example |
| | | 955 | −0.5 | 0.9 | 1.8 | Identical to pipe body | Burst at pipe body | Invented example |
| | | 955 | −1.3 | 0.0 | 1.1 | Identical to pipe body | Burst at pipe body | Invented example |
| | | 1005 | 0.2 | 0.8 | 2.0 | Identical to pipe body | Burst at pipe body | Invented example |
| | | 1010 | 0.8 | 0.6 | 1.8 | Identical to pipe body | Burst at pipe body | Invented example |

TABLE 3-continued

| Outer diameter (mm) | Wall thickness (mm) | Steel pipe strength (N/mm²) | Peaking value (mm) | | Height of reinforcement of weld metal at inner surface (mm) | Rupture strength | Fracture portion | Remarks |
|---|---|---|---|---|---|---|---|---|
| | | | Before pipe expansion | Changed amount after pipe expansion | | | | |
| | | 860 | 0.7 | 1.4 | 1.2 | Identical to pipe body | Burst at seam | Invented example |
| | | 1010 | 1.0 | 1.8 | 1.9 | Identical to pipe body | Burst at seam | Invented example |
| | | 1005 | 0.9 | 1.0 | 1.7 | Identical to pipe body | Burst at pipe body | Invented example |
| | | 1005 | 0.0 | 0.0 | 1.0 | Identical to pipe body | Burst at pipe body | Invented example |
| | | 1010 | −1.5 | −1.5 | 1.9 | Identical to pipe body | Burst at pipe body | Invented example |
| | | 1010 | 1.8 | 2.0 | 1.0 | Lower than pipe body | Burst at seam | Comparative example |
| | | 1005 | 1.5 | 0.3 | 2.2 | Lower than pipe body | Burst at seam | Comparative example |
| | | 955 | 1.3 | 1.5 | 1.6 | Lower than pipe body | Burst at seam | Comparative example |
| | | 955 | 1.9 | 2.1 | 1.4 | Lower than pipe body | Burst at seam | Comparative example |
| | | 1005 | −2.3 | −2.0 | 1.2 | Lower than pipe body | Burst at seam | Comparative example |
| | | 1010 | 0.3 | −1.0 | 2.4 | Lower than pipe body | Burst at seam | Comparative example |
| | | 860 | 0.8 | 0.1 | 2.1 | Lower than pipe body | Burst at seam | Comparative example |
| 914.4 | 12 | 1012 | 0.8 | 1.0 | 0.9 | Identical to pipe body | Burst at pipe body | Invented example |
| | | 970 | 0.0 | −0.5 | 1.4 | Identical to pipe body | Burst at pipe body | Invented example |
| | | 970 | 1.3 | 1.2 | 1.2 | Identical to pipe body | Burst at seam | Invented example |
| | | 970 | 1.2 | 1.6 | 2 | Identical to pipe body | Burst at seam | Invented example |
| | | 1012 | 2.5 | 2.1 | 1.5 | Lower than pipe body | Burst at seam | Comparative example |
| | | 1012 | 1.5 | 1.8 | 2 | Lower than pipe body | Burst at seam | Comparative example |
| | | 1012 | 0.2 | −0.3 | 2.4 | Lower than pipe body | Burst at seam | Comparative example |
| 914.4 | 20 | 940 | 0.8 | 1.2 | 1.9 | Identical to pipe body | Burst at seam | Invented example |
| | | 1000 | −0.5 | 0.0 | 1.7 | Identical to pipe body | Burst at pipe body | Invented example |
| | | 1000 | 0.6 | 0.9 | 1.4 | Identical to pipe body | Burst at pipe body | Invented example |
| | | 940 | 0.2 | 0.1 | 0.8 | Identical to pipe body | Burst at pipe body | Invented example |
| | | 1000 | 2.3 | 2.0 | 1.4 | Lower than pipe body | Burst at seam | Comparative example |
| | | 940 | 1.0 | 1.5 | 1.8 | Lower than pipe body | Burst at seam | Comparative example |
| | | 940 | 0.5 | −0.1 | 2.1 | Lower than pipe body | Burst at seam | Comparative example |
| 711.2 | 14 | 980 | 0.6 | 1.3 | 1.4 | Identical to pipe body | Burst at seam | Invented example |
| | | 860 | 0.2 | 0.0 | 1.2 | Identical to pipe body | Burst at pipe body | Invented example |
| | | 1020 | 1.1 | 1.0 | 1.9 | Identical to pipe body | Burst at pipe body | Invented example |
| | | 1050 | 2.8 | 2.0 | 1.7 | Lower than pipe body | Burst at seam | Comparative example |
| | | 900 | 2.0 | 1.9 | 1.4 | Lower than pipe body | Burst at seam | Comparative example |
| | | 1020 | 1.0 | 0.0 | 2.1 | Lower than pipe body | Burst at seam | Comparative example |

Example 2

The effects of employing the present invention are shown in Tables 4 and 5, shown hereunder, comparing the invented examples and the comparative examples. A rupture form index in Table 4 means the value obtained by subtracting the left side value from the right side value of the expression (3). As shown in Tables 4 and 5, in the expression (3) containing the hardness of a base metal, the hardness of a HAZ and a peaking amount or the expressions (3) and (4), when an index was minus, a brittlely ruptured section was observed in the tensile test and a rupture occurred from a seam weld in the burst test. On the other hand, in the above expression (3) or expressions (3) and (4), when an index was plus as the case of an invented example, it was clear that a rupture occurred from a pipe body.

TABLE 4

| Outer diameter (mm) | Wall thickness (mm) | Base metal hardness Hv | HAZ hardness Hv | Peaking value (mm) | Rupture form index | Joint tensile test | Burst test | Remarks |
|---|---|---|---|---|---|---|---|---|
| | | | | | | Form of rupture | | |
| 914.4 | 16 | 321 | 265 | 1.8 | −28 | Brittle | Burst at seam | Comparative example |
| 914.4 | 16 | 317 | 285 | 1.5 | −34 | Brittle | Burst at seam | Comparative example |
| 914.4 | 16 | 320 | 275 | 1.5 | −31 | Brittle | Burst at seam | Comparative example |
| 914.4 | 16 | 312 | 284 | 0.9 | −9 | Brittle | Burst at seam | Comparative example |
| 914.4 | 16 | 313 | 270 | 0.3 | 15 | Ductile | Burst at pipe body | Invented example |
| 914.4 | 16 | 315 | 270 | 0.6 | 3 | Ductile | Burst at pipe body | Invented example |
| 914.4 | 16 | 304 | 278 | 1.0 | 19 | Ductile | Burst at pipe body | Invented example |
| 914.4 | 16 | 320 | 262 | −0.5 | 1 | Ductile | Burst at pipe body | Invented example |
| 914.4 | 16 | 295 | 275 | 1.1 | 52 | Ductile | Burst at pipe body | Invented example |
| 914.4 | 12 | 315 | 285 | 1.8 | −27 | Brittle | Burst at seam | Comparative example |
| 914.4 | 12 | 321 | 275 | 1.0 | −19 | Brittle | Burst at seam | Comparative example |
| 914.4 | 12 | 321 | 278 | 1.8 | −34 | Brittle | Burst at seam | Comparative example |
| 914.4 | 12 | 315 | 265 | 1.0 | 5 | Ductile | Burst at pipe body | Invented example |
| 914.4 | 12 | 312 | 268 | 0.3 | 22 | Ductile | Burst at pipe body | Invented example |
| 914.4 | 12 | 321 | 260 | 0.5 | 3 | Ductile | Burst at pipe body | Invented example |
| 711.2 | 14 | 320 | 270 | 2.3 | −35 | Brittle | Burst at seam | Comparative example |
| 711.2 | 14 | 325 | 280 | 1.8 | −47 | Brittle | Burst at seam | Comparative example |
| 711.2 | 14 | 320 | 265 | 0.2 | 4 | Ductile | Burst at pipe body | Invented example |
| 711.2 | 14 | 308 | 265 | 1.6 | 11 | Ductile | Burst at pipe body | Invented example |
| 711.2 | 14 | 315 | 260 | 0.3 | 20 | Ductile | Burst at pipe body | Invented example |
| 711.2 | 14 | 305 | 265 | 2.0 | 13 | Ductile | Burst at pipe body | Invented example |

TABLE 5

| Outer diameter (mm) | Wall thickness (mm) | Peaking value (mm) Range of invention | Peaking value (mm) Measured value | Pipe expansion cracking | Remarks |
|---|---|---|---|---|---|
| 914.4 | 16 | −2.5–2.5 | 3.2 | Ruptured at weld | Comparative example |
| | | | 4.0 | Ruptured at weld | |
| | | | 2.7 | Ruptured at weld | |
| | | | −2.8 | Ruptured at weld | |
| | | | −3.0 | Ruptured at weld | |
| | | | 2.5 | No rupture | Invented example |
| | | | 1.8 | No rupture | |
| | | | 1.5 | No rupture | |

TABLE 5-continued

| Outer diameter (mm) | Wall thickness (mm) | Peaking value (mm) Range of invention | Measured value | Pipe expansion cracking | Remarks |
|---|---|---|---|---|---|
| | | | 0.3 | No rupture | |
| | | | −0.5 | No rupture | |
| | | | −2.3 | No rupture | |
| 914.4 | 12 | −3.3–3.3 | 3.6 | Ruptured at weld | Comparative example |
| | | | 3.8 | Ruptured at weld | |
| | | | 1.8 | No rupture | Invented example |
| | | | 1.0 | No rupture | |
| | | | 3.2 | No rupture | |
| | | | 0.3 | No rupture | |
| 914.4 | 20 | −2.0–2.0 | 2.5 | Ruptured at weld | Comparative example |
| | | | 2.3 | Ruptured at weld | |
| | | | 2.0 | No rupture | Invented example |
| | | | 1.6 | No rupture | |
| | | | 1.0 | No rupture | |
| | | | 0.2 | No rupture | |
| 711.2 | 14 | −2.8–2.8 | 3.2 | Ruptured at weld | Comparative example |
| | | | 3.0 | Ruptured at weld | |
| | | | 2.8 | No rupture | Invented example |
| | | | 2.2 | No rupture | |
| | | | 1.5 | No rupture | |
| | | | 1.2 | No rupture | |
| | | | 0.8 | No rupture | |
| | | | 0.3 | No rupture | |
| | | | −1.2 | No rupture | |
| | | | −1.6 | No rupture | |

What is claimed is:

1. A high-strength steel pipe excellent in formability, characterized in that, when a high-strength steel pipe exceeding 850 N/mm$^2$ in tensile strength is produced by a UOE method, a ratio (R/r) of an average radius of curvature in a range of 120 mm in a circumferential direction including a weld of the steel pipe before pipe expansion in a pipe expansion process (R) to a radius of the steel pipe after pipe expansion (r) is 0.65 to 2.0.

2. A high-strength steel pipe excellent in formability and burst resistance, characterized in that, when a high-strength steel pipe exceeding 850 N/mm$^2$ in tensile strength is produced by a UOE method, a ratio (R/r) of an average radius of curvature in a range of 120 mm in a circumferential direction including a weld of the steel pipe before pipe expansion in a pipe expansion process (R) to a radius of the steel pipe after pipe expansion (r) is 0.90 to 2.0.

3. A high-strength steel pipe excellent in burst resistance, characterized in that, when a high-strength steel pipe 900 N/mm$^2$ or more in tensile strength is produced by a UOE method, Vickers hardness of a base metal of the steel pipe Hv, the Vickers hardness at HAZ Hz, pipe wall thickness t, and a peaking amount at a weld of the steel pipe before pipe expansion in a pipe expansion process δ satisfy an expression (3), $$(1+0.005t|\delta|)Hz < 0.03584Hv^2 - 25.34Hv + 4712 \quad (3).$$

4. A high-strength steel pipe excellent in burst resistance according to claim 3, characterized in that the peaking amount δ satisfies an expression (4), $$|\delta| < 40/t \quad (4).$$

* * * * *